United States Patent
Kamiwada et al.

(10) Patent No.: US 7,424,733 B2
(45) Date of Patent: Sep. 9, 2008

(54) DEVICE CONTROL SYSTEM

(75) Inventors: Toru Kamiwada, Kawasaki (JP);
Toshihiro Azami, Kawasaki (JP);
Takushi Fujita, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 723 days.

(21) Appl. No.: 09/955,945

(22) Filed: Sep. 20, 2001

(65) Prior Publication Data
US 2002/0180581 A1 Dec. 5, 2002

(30) Foreign Application Priority Data
May 29, 2001 (JP) .............................. 2001-160083

(51) Int. Cl.
*H04L 29/00* (2006.01)

(52) U.S. Cl. .............................. 726/4; 726/7; 340/5.2; 340/5.5

(58) Field of Classification Search ................. 713/168, 713/170, 176, 193; 340/5.2, 5.22, 5.5, 5.54, 340/5.61; 726/4, 7
See application file for complete search history.

(56) References Cited

U.S. PATENT DOCUMENTS

| | | | | |
|---|---|---|---|---|
| 5,875,395 | A * | 2/1999 | Holmes ....................... | 455/420 |
| 6,021,324 | A * | 2/2000 | Sizer et al. ................. | 455/403 |
| 6,148,404 | A * | 11/2000 | Yatsukawa .................. | 713/200 |
| 6,185,316 | B1 * | 2/2001 | Buffam ....................... | 382/115 |
| 6,353,413 | B1 * | 3/2002 | White et al. ................ | 342/453 |
| 6,564,056 | B1 * | 5/2003 | Fitzgerald ................ | 455/435.1 |
| 6,751,472 | B1 * | 6/2004 | Muhonen .................. | 455/553.1 |
| 6,779,030 | B1 * | 8/2004 | Dugan et al. ............... | 709/223 |
| 6,901,241 | B2 * | 5/2005 | Bjorndahl .................. | 455/41.2 |
| 2002/0103898 | A1 * | 8/2002 | Moyer et al. ................ | 709/224 |
| 2007/0296552 | A1 * | 12/2007 | Huang et al. ............... | 340/10.5 |

FOREIGN PATENT DOCUMENTS

JP   6-110539   4/1994

(Continued)

OTHER PUBLICATIONS

Davidson, "CEBus: A New Standard in Home Automation", Circuit Cellar Ink, Aug. 1989, Retrieved from the Internet on May, 18, 2006: <URL: http://www.circuitcellar.com/library/print/hcs-pdf/10-Davidson.pdf>.*

(Continued)

*Primary Examiner*—Gilberto Barron, Jr.
*Assistant Examiner*—Minh Dinh
(74) *Attorney, Agent, or Firm*—Staas & Halsey LLP

(57) ABSTRACT

The object of the present invention is, in a device control system that controls devices within a house, to reduce the effort required of a user during authentication, as well as to prevent unauthorized access by a third party. A device control system access restriction method includes the steps of accepting registration of terminal information for associating an identifier unique to an operating terminal with operating terminal access right, of accepting instruction information including operating terminal identifier and instruction signals relating to operations of a device, of determining the access right of an operating terminal based on the operating terminal identifier included in instruction information, and of controlling the device based on operating terminal access right and instruction signals relating to that device.

7 Claims, 9 Drawing Sheets

FOREIGN PATENT DOCUMENTS

| | | |
|---|---|---|
| JP | 9-121335 | 5/1997 |
| JP | 10-161880 | 6/1998 |
| JP | 11-122681 | 4/1999 |
| JP | 11-164055 | 6/1999 |
| JP | 11-212849 | 8/1999 |
| JP | 2000-48091 | 2/2000 |
| JP | 2001-060972 | 3/2001 |

OTHER PUBLICATIONS

Wacks, "Introduction to the CEBus Communications Protocol", 1997, Retrieved from the Internet on May 18, 2006: <URL: http://www.hometoys.com/htinews/aug97/articles/kwacks/kwacks.htm>.*

Office Action issued Oct. 4, 2005 by Japanese Patent Office. Corresponding Japanese Patent Application No. 2001-160083.

* cited by examiner

DEVICE CONTROL SYSTEM

BACKGROUND OF THE INVENTION

1. Technical Field

The present invention relates to a device control system for controlling the operation of home devices such as televisions, video decks, and other audiovisual equipment; telephones, personal computers, and other information/telecommunications equipment, and air conditioners, refrigerators, and other household appliances, through the use of a remote control unit or other operating terminal located either within the home or outside it, and for using wireless or wired information/telecommunication technology to make use of information stored on a home server or acquired from an external source via the home server.

2. Description of Related Art

Remote control units for the remote operation of home devices most often have a one-to-one correlation with each device (that is, there is one unit for each device), meaning that a plurality of remote control units is needed to operate a plurality of devices. For this reason, integrated remote control units have been proposed that store the signals sent by a plurality of remote control units, so that a plurality of devices can be controlled by a single operating terminal. While this integrated remote control unit does allow control of each device while its user is inside the house, it does not allow control of each device from outside of the house.

A configuration of a device control system is conceivable such that televisions, video decks, and other home audiovisual equipment; telephones, personal computers, and other information/telecommunication equipment; and air conditioners, refrigerators, and other household appliances are connected via a home network, and each device is controlled by a device control server (home server) interconnected with this home network. In such a case, to order to access from outside the home, a connection is made to the home server via the network; authentication of the operator becomes necessary to prevent unauthorized access by a third party. One way to prevent unauthorized access by a third party would be to have a password for operating each device chosen in advance, and then to authenticate by receiving input of a password from an operating terminal from which instruction for the operation of a device has been made.

There are also cases where the home server includes such elements as storage means for storing acquired various types of information and external connection means for providing various types of information acquirable from the outside over the external network. There will be cases where it will be necessary to authenticate and specify a user before providing these various types of information. For example, image content deemed inappropriate for underage viewers requires determination of whether or not output should be allowed before the image content is selected and outputted to a television. In such cases, the input of a password serving as authentication information for identifying a user is required; by determining whether or not the password inputted by the user is correct, a device such as a television is controlled and the output of the content is controlled.

In order to distinguish between cases where access is from within the house where the devices are located and cases where access is from outside the house, a different password may be set up for each operating terminal. Alternatively, a different password can be set for each piece of content or type of content. By so doing, even if one password was learned by a third party, the effect that access by that third party has on other parts of the network can be restricted, and the damage caused by unauthorized access can be kept to a minimum.

If, in the device control system as described above, user authentication is required when accessing the home server, whether from inside or outside the house, that means that, inconveniently, a password has to be input each time access is made. Further, if only a password is used for authentication, in case a third party finds out the password, the third party can make unauthorized access.

Periodically changing the password does have the effect of restricting unauthorized access. However, this does not completely eliminate the threat of unauthorized access; and furthermore, changing a password requires a user to perform an involved process, and it also increases the possibility that a user will forget a password. If different passwords are set for each of the operating terminals from which access can be made, or if different passwords are set for each type of content and each available service, users will have to remember all the different passwords, and there is a good chance that they will forget some.

By recording passwords in a remote control unit or other operating terminal, the task of inputting passwords can be eliminated, but if a third party learns these passwords, there is no way to prevent unauthorized access. Particularly, unauthorized access could lead to private household information being extracted or modified. In that case, considerable inconvenience is likely to be caused.

SUMMARY OF THE INVENTION

It is an objective of the present invention to present a device control system for controlling devices within a home that not only reduces the work involved in user authentication but also prevents unauthorized access by a third party.

An access restriction method for a device control system of the present invention comprises a device control server interconnected over a wired or wireless home network with one or more devices within a home, and an operating terminal capable of wired or wireless transmission of instruction signals relating to operation of the one or more devices. The method includes the steps of:

accepting registration of terminal information for associating a unique identifier established for the operating terminal with the operating terminal access right; accepting instruction information including the operating terminal identifier and the instruction signals relating to the one or more devices;

determining the operating terminal access right based on the operating terminal identifier included in the instruction information; and controlling the one or more devices based on the operating terminal access right and the instruction signals relating to the one or more devices.

The access restriction method for a device control system may be configured to further include a step for performing authentication of the operating terminal when accepting registration of the operating terminal. The authentication is performed by:

receiving a public key set for the operating terminal; receiving predetermined data that has been encrypted with a secret key at the operating terminal, decrypting the data using the public key, and comparing the decrypted data with the predetermined data.

The access restriction method for a device control system may be configured to further include a step for acquiring and storing within storage means electronic information, wherein, when the instruction signals relating to the one or more devices include access to electronic information stored in the storage means, determination of whether to allow the electronic information to be presented is made based on the operating terminal access right.

The access restriction method for a device control system may be configured to control the one or more devices after determination of whether to allow the access to an external network is made based on the operating terminal access right, when the instruction signals relating to operation of the one or more devices include access to an external network. In this case, the method may be configured to determine whether to grant access is made for each content on the external network.

The access restriction method for a device control system may be configured to determine whether the operating terminal is located inside or outside the house, when instruction signals from the operating terminal have been received, and determine operating terminal access right based on the results of the determination and on the operating terminal identifier included in the instruction information.

The access restriction method for a device control system may be further configured to include a step for accepting registration of individual information for associating information relating to a user operating the operating terminal with the operating terminal, extract individual information associated with this operating terminal based on the operating terminal identifier included in the instruction information, and determine of access right based on the individual information and the terminal information.

The present invention provides a program for executing on a computer an access restriction method for the above mentioned device control system.

The present invention also provides a computer-readable recording medium on which is recorded a program for executing on a computer an access restriction method for the above mentioned device control system.

The present invention provides a device control server interconnected over a wired or wireless home network with one or more devices in a home, the server controlling the one or more devices based on instruction signals relating to the operation of the one or more devices sent from an operating terminal. The server comprises:

terminal information acceptance means for accepting registration of an terminal information for the purpose of associating a unique identifier set for the operating terminal with the operating terminal access right;

terminal information storage means for storing the terminal information;

instruction information acceptance means for accepting instruction information that includes an identifier for the operating terminal and instruction signals relating to the operating terminal;

access right determination means for determining the access right of the operating terminal based on the instruction information; and device control means controlling the one or more devices based on the access right of the operating terminal as determined by the access right determination means and on instruction signals relating to operation of the one or more devices included in the instruction information.

Here, the device control server may be configured to further include:

public key acceptance means for, when accepting registration of the terminal information, accepting a public key set for the operating terminal and storing the public key along with the terminal information in the terminal information storage means; and operating terminal authentication means for performing authentication on the operating terminal by sending predetermined data, receiving the predetermined data after encryption thereof at the operating terminal using a secret key, decrypting using the public key, and comparing with the predetermined data.

Terminal information acceptance means may be configured so as to accept, as part of terminal information, registration of a public key associated with an identifier of an operating terminal.

The device control server may be further configured to comprise electronic information acquisition means for acquiring electronic information and electronic information storage means for storing electronic information acquired by the electronic information acquisition means, so that when the instruction signals relating to the one or more devices include access to electronic information stored in the electronic information storage means, the access right determination means determines the access right of the operating terminal before determining whether or not to allow presentation of the electronic information.

The device control server may be also configured to further comprise external communication means capable of connecting with an external network existing outside the house, wherein:

when the instruction signals relating to operation of the one or more devices include access to the external network, the access right determination means determines the access right of the operating terminal before determining whether to grant access to the external network. In this case, the device control server may be configured to determine whether access should be granted for each content on the external network.

The device control server may be further configured to comprise terminal location determination means for determining whether the operating terminal is inside or outside the house based on instruction information accepted by the instruction acceptance means, wherein the access right determination means determines access right for the operating terminal based on determination results of the location determination means.

The device control server may be also configured to comprise individual information acceptance means accepting registration of individual information for associating information relating to a user operating the operating terminal with the operating terminal, wherein the access right determination means extracts individual information associated with this operating terminal based on the operating terminal identifier included in the instruction information, and determines access right based on the individual information and the terminal information.

The present invention provides an operating terminal that in a device control system having a device control server interconnected over a wired or wireless home network with one or more devices within a home, sends instruction signals relating to operations of the one or more devices comprising:

identifier storage means storing a unique identifier; terminal information registration means for registering the identifier on the device control server;

input acceptance means for accepting input of instructions relating to operation of the one or more devices;

instruction information generation means for generating instruction information based on inputted instructions accepted by the input acceptance means and on an identifier stored in the identifier storage means; and instruction information transmission means for wired or wireless transmission of instruction information generated by the instruction information generation means.

Here, the operating terminal may be configured to comprise location information acquisition means for acquiring current location information, wherein:

the instruction information generation means generates instruction information based on the inputted instructions, the identifier, and location information acquired by the location information acquisition means.

The operating terminal may be also configured to comprise individual information input means for accepting the input of information relating to the operating user, wherein:

the instruction information generation means generates instruction information based on the inputted instructions, the identifier, and information relating to a user accepted by the individual information input means.

The system can be configured so that it further includes encryption key storage means for storing an encryption key for encrypting instruction information, and so that instruction information generation means uses an encryption key stored in encryption key storage means to encrypt inputted instruction and the identifier, thus generating instruction information.

The operating terminal may be also configured to comprise secret key storage means for storing a secret key; public key storage means for storing a public key corresponding to the secret key; and encryption means for encrypting data by using the secret key.

The operating terminal sends the public key to the device control server during registration of terminal information at the device control server by the terminal information registration means, and, when transmitting the instruction information, encrypting predetermined data received from the device control server by using the secret key and sending this as authentication information.

From the following detailed description in conjunction with the accompanying drawings, the foregoing and other objects, features, aspects and advantages of the present invention will become readily apparent to those skilled in the art.

DETAILED DESCRIPTION OF THE PREFERRED EMBODIMENTS

Overall Configuration

Figure 1:
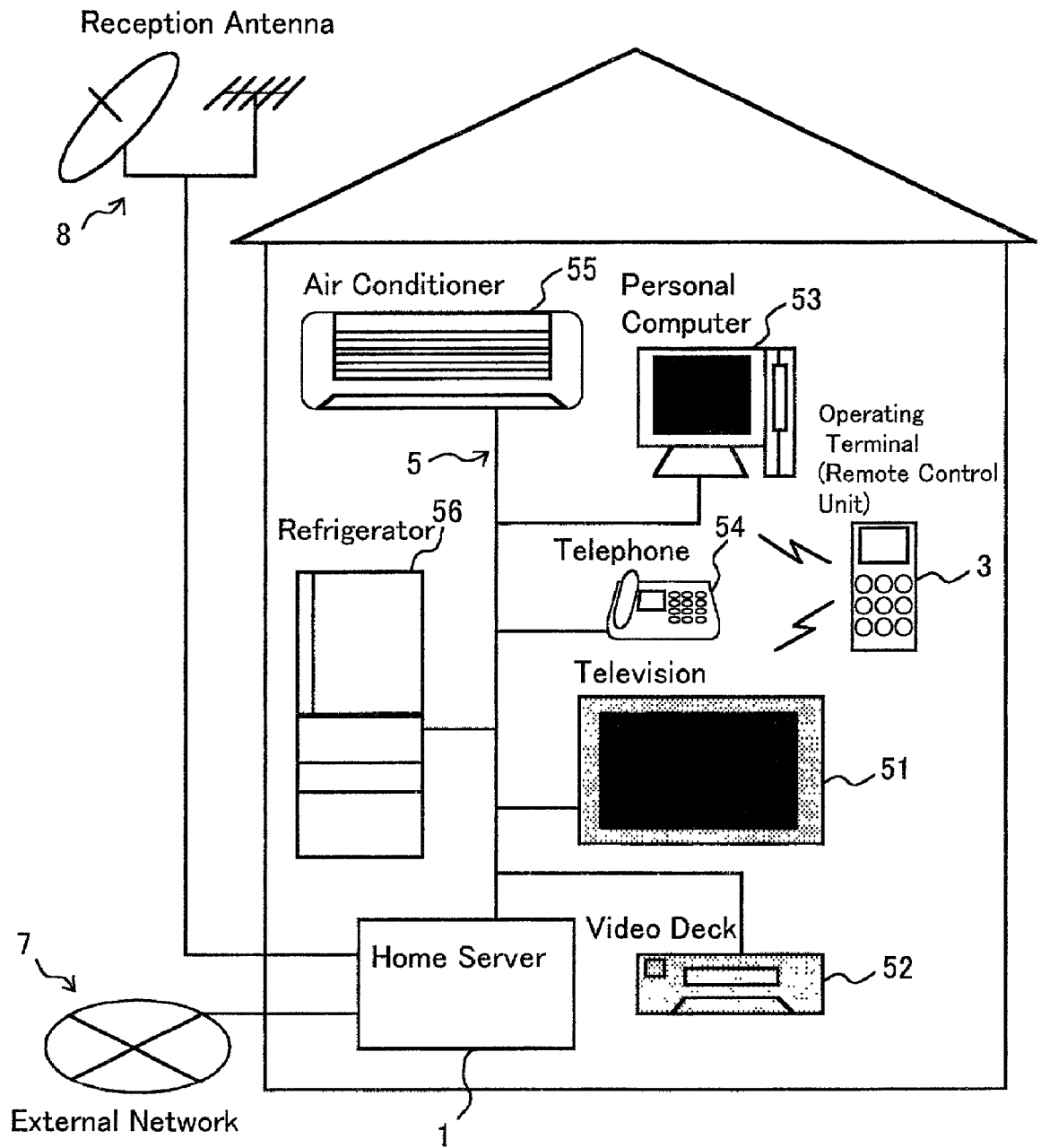
FIG. 1 is an explanatory diagram showing the schematic configuration of the present invention.

FIG. 1 is a schematic configuration of a device control system according to the first embodiment of the present invention.

Audiovisual equipment such as a television 51 and a video deck 52, information/communication equipment such as a personal computer 53 and a telephone 54, and household appliances such as an air conditioner 55 and a refrigerator 56, all of which are within a home, are interconnected with a home server 1 by means of a home network 5. The home network 5 may be either wired or wireless, and can be, for example, a wired LAN such as an Ethernet network or a power-line LAN, or a wireless LAN employing wireless communications means using radio waves, such as those specified by Bluetooth, HomeRF, or IEEE 802.11B, or a wireless LAN employing wireless communications means using infrared rays, such as those specified by IrDA.

Devices such as the television 51, video deck 52, personal computer 53, telephone 54, air conditioner 55, and refrigerator 56 can be operated using a remote control unit 3. This remote control unit 3 includes, for example, operating buttons for receiving input of instructions for the operation of devices, an infrared ray transmission means for transmitting instruction information based on instructions inputted and received and for receiving data from devices, and display means for displaying received operational contents and data received from devices. The remote control unit 3 can be configured to transmit instruction information to each device, or it can be configured to transmit instruction information to the home server 1.

The home server 1 can receive image, audio, text and other types of information by means of a broadcast reception means 8, which can be a terrestrial wave reception antenna, a satellite broadcast reception antenna, a cable connection unit for cable television and the like, and can present received information to a user via the television 51 and video deck 52.

The home server 1 is also interconnected with an external network 7, such as a telephone line or the Internet, and can transmit data to and receive data from external parties, by means of the personal computer 53 or telephone 54.

Figure 2:
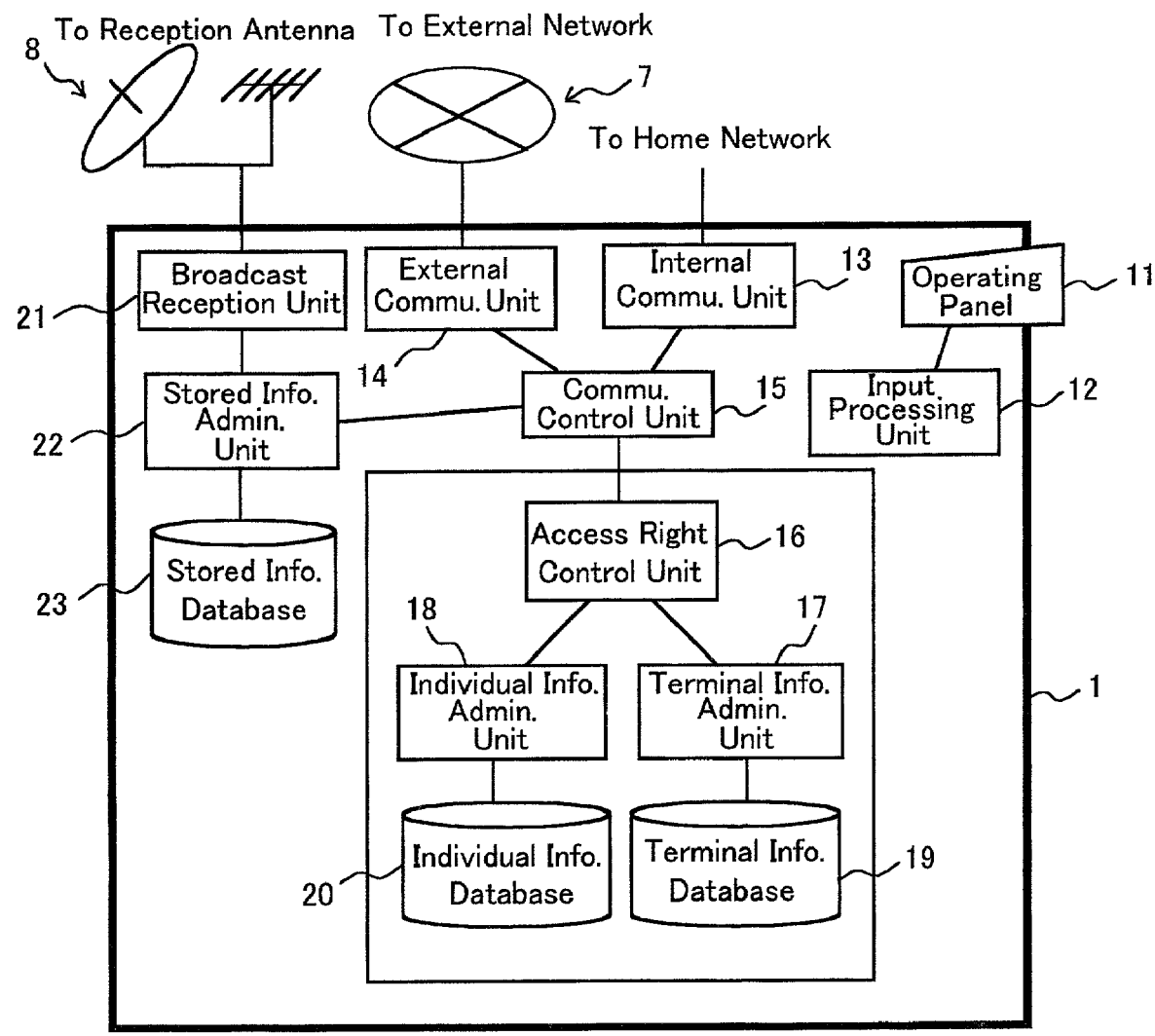
FIG. 2 is a block diagram showing the schematic configuration of a device control server.

The home server 1 may be configured as shown, for example, in FIG. 2.

The home server 1 includes an operating panel 11 for accepting various types of information. This operating panel 11 can comprise a keyboard or operating buttons, connected either by wire or wirelessly, and if the home server 1 has a CRT or an LCD panel, it can include a pointing device, such as a mouse or trackball. Various information inputted at the operating panel 11 is accepted by an input processing unit 12, and is transmitted to the corresponding component by a communications control unit 15.

The home server 1 also includes an internal communication unit 13 interconnected with the home network 5. This internal communication unit 13 transmits data with the home network 5, and comprises an interface with, as is discussed above, a wired LAN such as an Ethernet network or a power-line LAN, or a wireless LAN employing wireless communications means using radio waves, such as those specified by Bluetooth, HomeRF, IEEE 802.11b, or a wireless LAN employing wireless communications means using infrared rays, such as those specified by IrDA.

The home server 1 also includes an external communication unit 14 interconnected with the external network 7. This external communication unit 14 can be configured by a router or modem for connecting with a telephone line or the Internet.

The home server 1 also includes a broadcast reception unit 21 for receiving image, audio, text and other types of information received by the broadcast reception antenna 8. The broadcast reception unit 21 is interconnected with a stored information administration unit 22 that administrates the matter of whether received information should be stored in a stored information database 23. The stored information database 23 can be configured by a data storage means using a recording medium such as a hard disk drive, an MO disk, CD-R, CD-RW, DVD and the like.

The input processing unit 12, internal communication unit 13, external communication unit 14 and stored information administration unit 22 are interconnected with a communication control unit 15. The communication control unit 15 is further connected with an access right control unit 16. This access right control unit 16 is connected with a terminal information administration unit 17, and an individual information administration unit 18.

The terminal information administration unit 17 updates a terminal information database 19 based on terminal information inputted from the remote control unit 3 or from the operating panel 11 or the like, and in accordance with requests from the access right control unit 16 reads contents of the terminal information database 19 and presents terminal information.

The individual information administration unit 18 updates the individual information database 20 based on individual information inputted from the remote control unit 3 or from the operating panel 11 or the like, and in accordance with requests from the access right control unit 16 reads contents of the individual information data base 20 and presents individual information.

The communication control unit 15, based on instruction information sent from a user or each device, sends to the device to which instruction information is directed information sent from each device, information received at the external communication unit 14, information received at the broadcast reception unit 21, or information stored in the stored information database 23, and presents the same to a user; and in the event that the communication control unit 15 has received registration information, such as terminal information relating to the remote control unit 3 or other operating terminal or individual information of a user using an operating terminal, it will send this information to the terminal information management unit 17 or individual information management unit 18 and cause such information to be registered.

Figure 3:
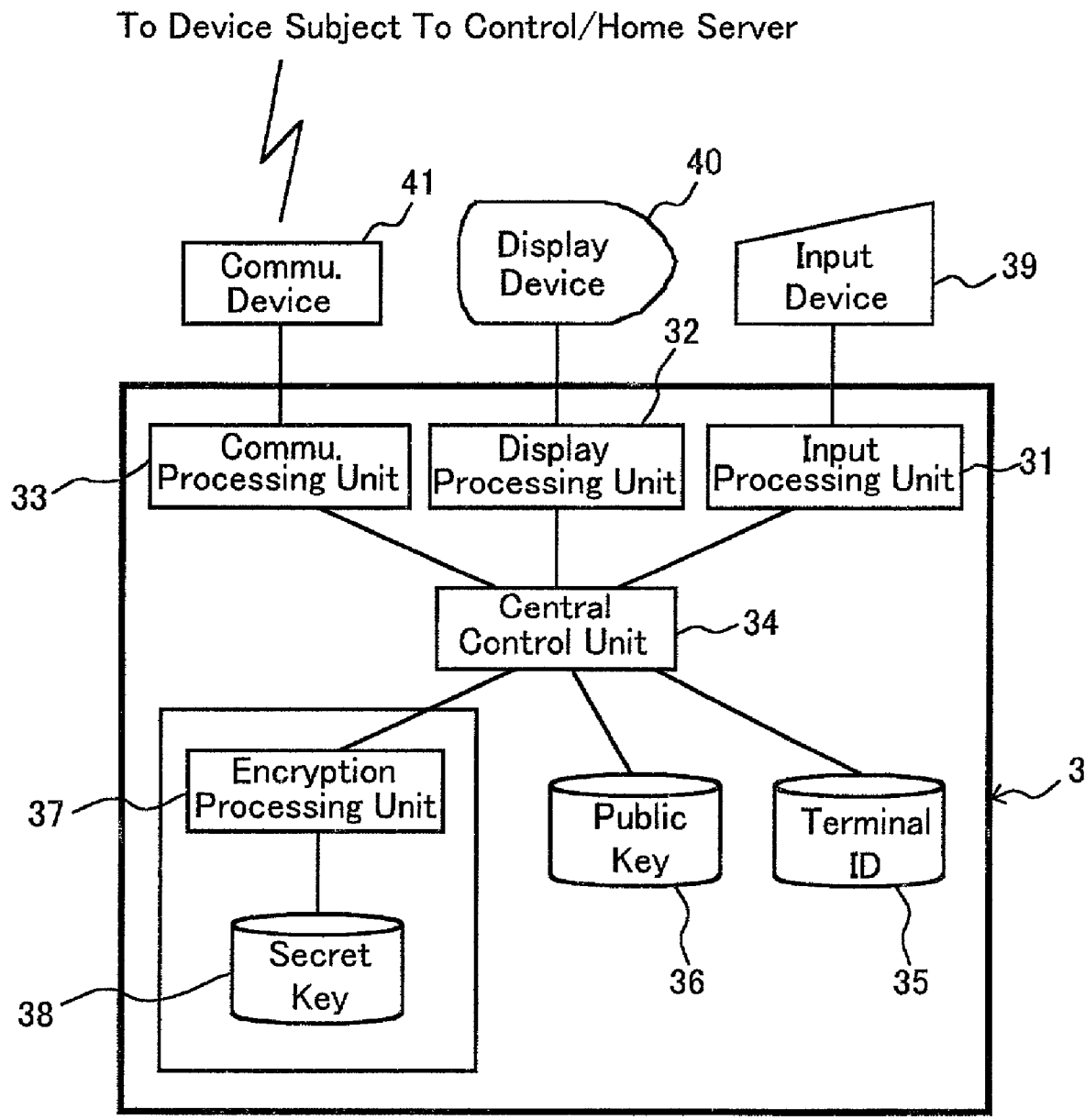
FIG. 3 is a block diagram showing the schematic configuration of an operating terminal.

FIG. 3 shows a schematic configuration of the remote control unit 3.

The remote control unit 3 includes an input device 39 for accepting the input of instructions from a user. The input device 39 comprises standard pushbuttons or the like, or it can comprise a touch panel wherein transparent electrodes are superimposed on a liquid crystal display panel.

The remote control unit 3 includes a display device 40 for displaying the instructions inputted by a user, the current operational mode of the remote control unit, the operational modes of each device, and other such information. A display device such as a liquid crystal display panel, an LED device, or an EL device can be employed as the display device 40.

The remote control unit 3 has a communication device 41 capable of communicating with each device or the home server 1. Communication means using an infrared communications protocol such as IrDA can be employed as the communication device 41, or communication means using radio waves, such as those specified by Bluetooth, HomeRF, or IEEE 802.11b can be also employed. Further, the communication device 41 can be connected to a device or the home server 1 through a wire.

The remote control unit 3 contains a central control unit 34 for controlling each component. This central control unit 34 is interconnected with an input processing unit 31, a display processing unit 32, a communication processing unit 33, a terminal ID storage unit 35, a public key storage unit 36, an encryption processing unit 37 and the like.

The input processing unit 31 receives user instructions inputted at the input device 39. The display processing unit 32 sends instructions inputted at the input device 39, operational mode of the remote control unit 3, operational modes of each device, and other information to the display device 40, and causes the display thereof. The communication processing unit 33 sends instruction information based upon user-inputted instructions to each device or to the home server 1, and receives information relating to the operational modes and operational states of each device, and sends this information to the central control unit 34.

The terminal ID storage unit 35 stores an identifier unique to the remote control unit 3, and stores a preset product ID and a unique ID inputted at the input device 39 or the like by a party having the right to set such an ID. This terminal ID storage unit 35 can be a recording device such as a ROM, EEPROM, or RAM with power backup.

The public key storage unit 36 stores the public key set for each operating terminal and sent beforehand to the home server 1 or other recipient of instruction information. This public key storage unit 36 can be a recording device such as a ROM, EEPROM, or RAM with power backup.

The encryption processing unit 37 encrypts instruction information to be transmitted using a encryption key stored in a secret key storage unit 38; it can be constituted by the secret key storage unit 38 and an IC chip serving as a logical operation circuit.

Registration Processing

An explanation will be given of operations when the remote control unit 3 is registered as an operating terminal for each device.

Figure 4:
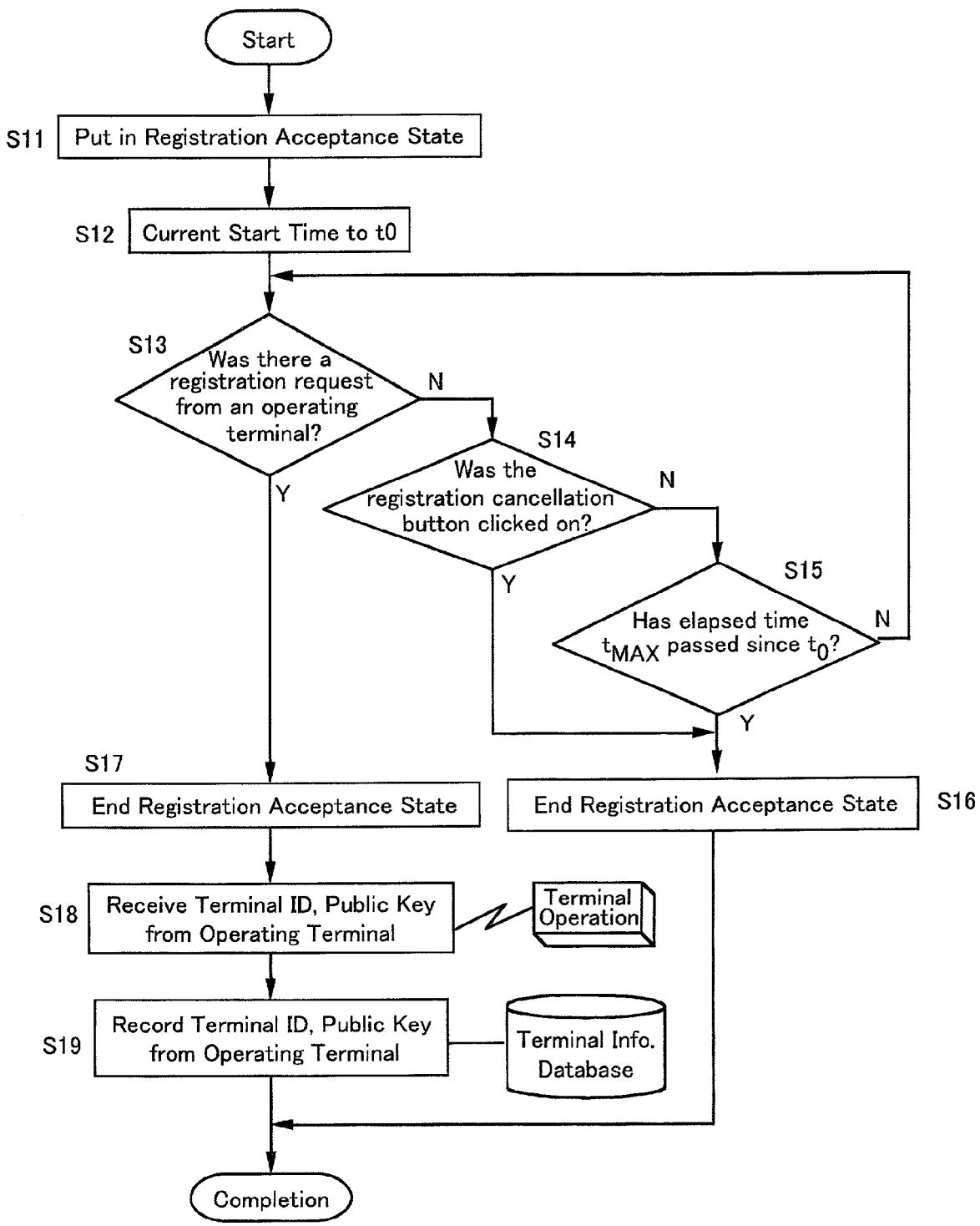
FIG. 4 is a flowchart showing registration acceptance processing at a device control server.

FIG. 4 shows a flowchart of registration processing on the home server 1.

In step S11, the home server 1 receives terminal information via the internal communication unit 13, and sets a registration acceptance state for storing this terminal information in the terminal information database, via the communication control unit 15, access right control unit 16 and terminal information administration unit 17. In step S12, the current time is substituted for registration acceptance state commencement time $t_0$.

In step S13, it is determined whether or not there has been a registration request from an operating terminal. If a registration request has been received from the remote control unit 3, then control proceeds to step S17; if there has been no registration request from the remote control unit 3, then control proceeds to step S14.

In step S14, it is determined whether or not a registration cancellation button has been inputted. If instructions for registration cancellation have been inputted and received from the remote control unit 3, then control proceeds to step S16; if there have been no registration cancellation instructions inputted, then control proceeds to step S15.

In step S15, it is determined whether or not time elapsed from time $t_0$ has reached or surpassed predetermined time $t_{MAX}$; if it is determined that predetermined time $t_{MAX}$ has elapsed since the commencement of registration acceptance state, control proceeds to step S16, and if not, control returns to step S13.

In step S16, the registration acceptance state is ended and the processing is terminated.

In step S17, the registration acceptance state is ended. Specifically, a signal indicating receipt of registration request is sent to the remote control unit 3 that sent the registration request, and new registration requests from other operating terminals are prohibited.

In step S18, terminal ID and public key are received from an operating terminal. Specifically, an identifier for the remote control unit 3 stored in the terminal ID storage unit 35 of the remote control unit 3 and a public key stored in the public key storage unit 36 are received. In this case, a configuration is possible such that information of the terminal ID and public key sent from the remote control unit 3 are received at any one of each device interconnected with the home network 5, which then transmits this information to the external communication unit 14 of the home server 1; alternatively, a configuration is possible such that the home server 1 receives information directly from the remote control unit 3.

In step S19, the terminal ID of the operating terminal and public key, having been received, are recorded. Specifically, the identifier unique to the remote control unit 3 and the public key are stored in the terminal information database 19.

Figure 5:
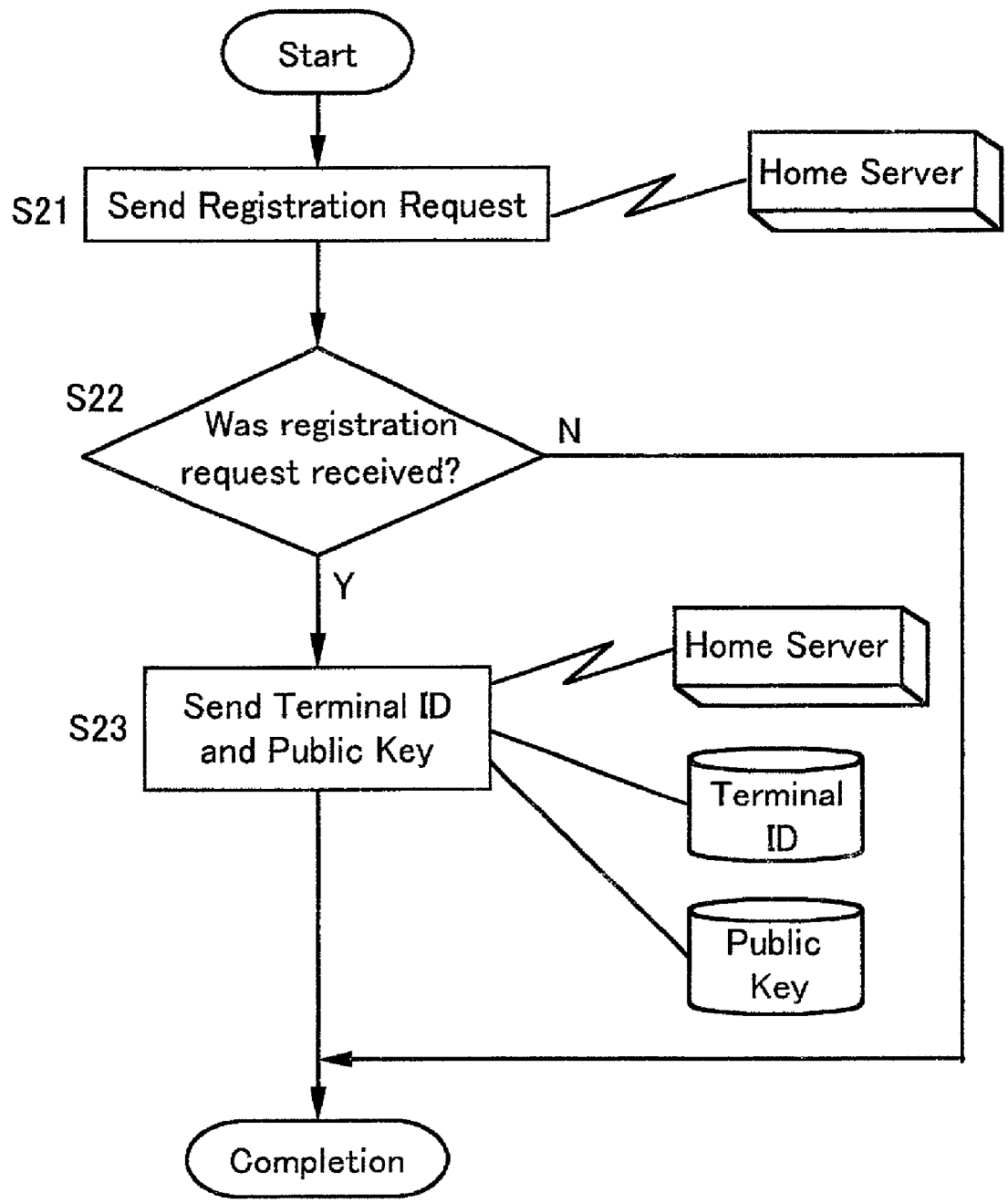
FIG. 5 is a flowchart showing registration processing at an operating terminal.

FIG. 5 is a flowchart showing the operations of the remote control unit 3 during registration processing.

In step S21, a registration request is sent. Specifically, a registration request signal is sent using the communication device 41 to any of the devices interconnected with the home network 5, or directly to the home server 1.

In step S22, it is determined whether or not a registration request has been received. If a signal indicating receipt of registration request is received from the home server 1, then control proceeds to step S23.

In step S23, terminal ID and public key are sent. Specifically, an identifier unique to the remote control unit 3 stored in the terminal ID storage unit 35 and a public key stored in the public key storage unit 36 are read and sent via the communication device 41.

Operating Terminal Authentication

An explanation will be given of the operating terminal authentication procedures when an operating terminal is used to access a home server.

Figure 6:
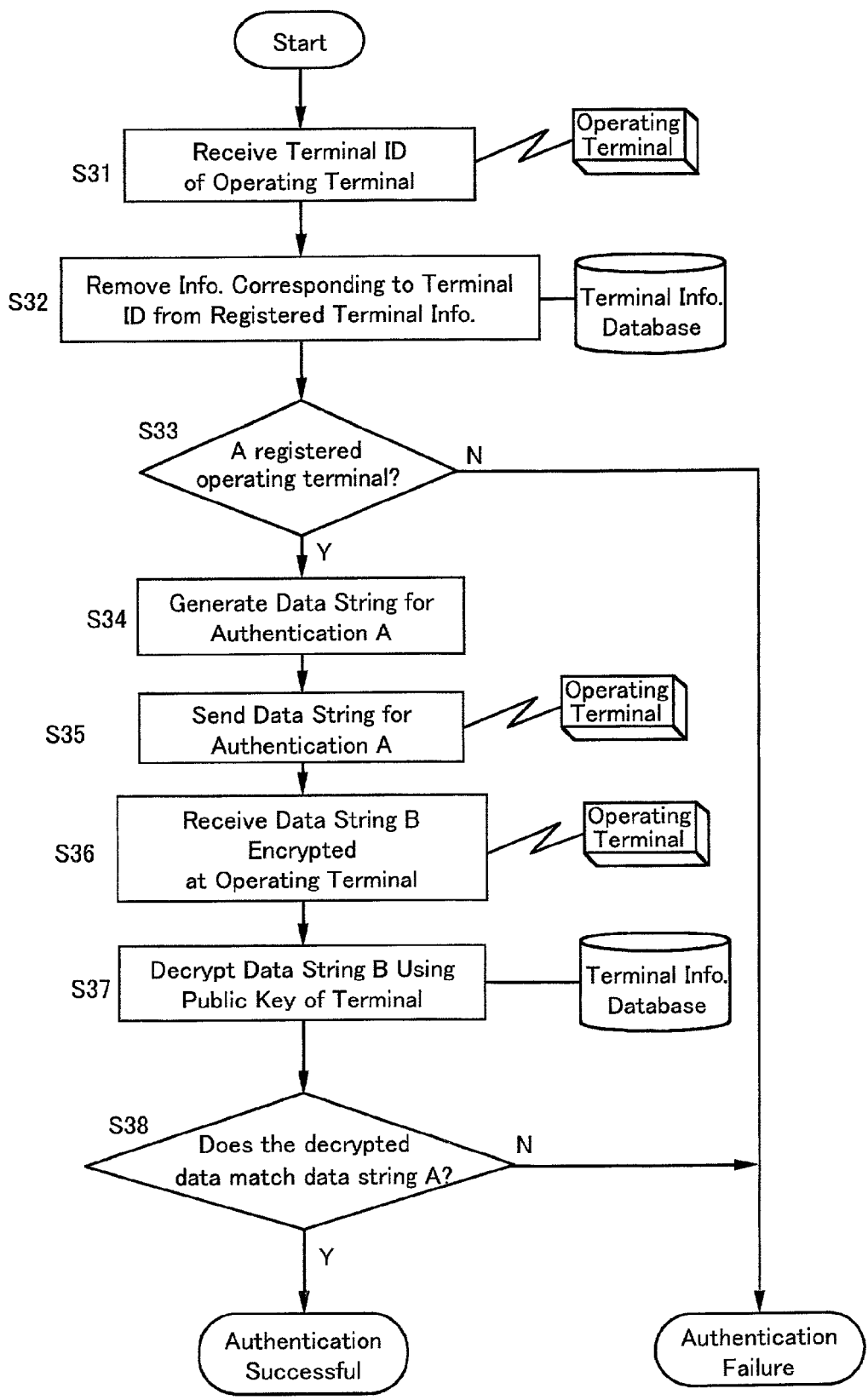
FIG. 6 is a flowchart showing terminal authentication processing at a device control server.

In this explanation, reference will be made to FIG. 6, a flowchart of the operating terminal authentication operations performed by the home server 1 when it accepts access from an operating terminal.

In step S31, the terminal ID of an operating terminal is accepted. Specifically, it receives a terminal ID sent from the remote control unit 3 via the internal communication unit 13 or the like, and accepts this.

In step S32, terminal information corresponding to the transmitted terminal ID is extracted from registered terminal information. Specifically, the terminal information database 19 is searched and terminal information corresponding to the received terminal ID is extracted.

In step S33, it is determined whether or not the received terminal ID is a registered operating terminal. If the terminal ID is not registered in the terminal information database 19, an error message indicating failure to authenticate is transmitted to the operating terminal and the processing is terminated. If the terminal ID is present in the terminal information database 19, then control proceeds to step S34.

In step S34, a data string A for authentication is generated. Specifically, data string A is generated as data for authentication using a predetermined method. In step S35, data string for authentication A is sent to the operating terminal. In step S36, a data string B, which has been encrypted at the operating terminal is received. This data string B is the transmitted data string for authentication A which has been encrypted at the operating terminal using a secret key. In step S37, the received encrypted data string B is decrypted using the public key corresponding to the operating terminal. Specifically, the encrypted data string B is decrypted using the public key included in the terminal information extracted from the terminal information database 19.

In step S38, it is determined whether the decrypted data matches the data string for authentication A. Data that has been encrypted with a secret key stored in the secret key storage unit 38 of the remote control unit 3 can be decrypted only by the corresponding public key; thus if the operating terminal that sent the encrypted data string B encrypted with the secret key is the proper operating terminal, then the data decrypted with the public key should match the original data string for authentication A. If the decrypted data matches the data string for authentication A, then a message indicating successful authentication is sent, and instruction information relating to the operation of a device is accepted; if the decrypted message does not match the data string for authentication A, then a message indicating failure to authenticate is sent, and the processing is terminated.

Figure 7:
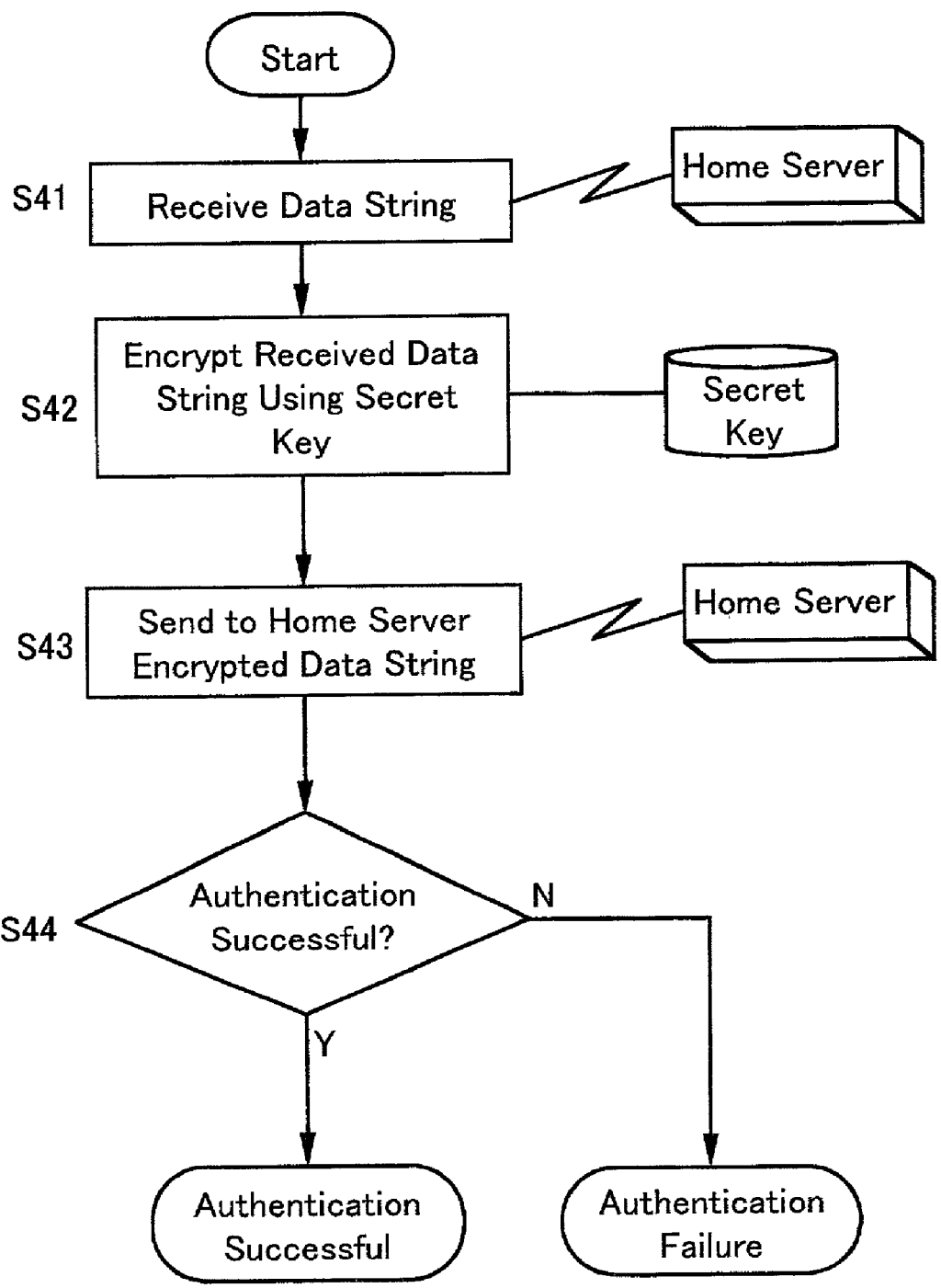
FIG. 7 is a flowchart showing operation of an operating terminal at time of terminal authentication processing.

An explanation will be made of operations at time of authentication of an operating terminal when access is made from the remote control unit 3 by referring to a flowchart of FIG. 7.

In step S41, the remote control unit 3 receives data string for authentication A, which has been transmitted by the home server 1 is received. In step S42, the received data string for authentication A is encrypted by the secret key. Specifically, the encryption processing unit 37 uses the secret key stored in the secret key storage unit 38 to encrypt the data string for authentication A, thus generating the encrypted data string B. The secret key stored in the secret key storage unit 38 is configured so that it cannot be read by an outside party, and is used only for encryption by the encryption processing unit 37.

In step S43, the encrypted data string B is sent to the home server 1. Specifically, the communication device 41 is used to make transmission to any of the devices interconnected with the home network 5, or directly to the home server 1.

In step S44, it is determined whether authentication was successful. If a message indicating successful authentication is received from the home server 1, the next processing commences. If a message indicating authentication failure is received from the home server 1, the authentication failure message is displayed on the display device 40 and the processing is terminated.

Operation Control

An explanation will be given of an example of when instruction information for each device is transmitted from the remote control unit 3 and the device is operated.

The home server 1 can store image data received via the broadcast reception unit 21 in the stored information database 23. From here, an explanation will be given for a case where image data stored in this stored information database 23 is displayed on the television 51 through operation of the remote control unit 3. The television 51 permits such operations as channel selection and menu selection through use of the remote control unit 3, and is interconnected with the home server 1 over the home network 5.

The remote control unit 3 is used to make a television menu selection and then request the display of a list of information on the home server 1. Upon receiving the menu selection, the television 51 communicates with the home server 1 and requests a list of information stored in the stored information database 23. At the same time this list information is requested, the terminal ID of the remote control unit 3 to which the instruction information is sent is also sent.

The home server 1 which received the request for list information performs authentication of the operating terminal, using the received terminal ID. As described above, authentication of an operating terminal can be performed by generating and sending text string A for authentication, receiving text string B encrypted with the secret key, decrypting it with the public key and then comparing it against the text string A. When authentication of an operating terminal is successful, the home server 1 transmits a list of information stored in the stored information database 23.

The television 51 displays the list information sent from the home server 1, and prompts a user to select image data the user wants to watch. The selection of this image data is also configured so that instruction information sent through the operation of the remote control unit 3 is received by the television 51 and sent to the home server 1 over the home network 5.

The home server 1 performs authentication of the operating terminal for an image data selection request, too, and only if authentication is successful will it send the image data to the television 51 and cause the display thereof.

Access from Outside a Home

In the above-described example, the operating terminal is an integrated remote control used within a house. Another configuration would be to have access made from outside the house and instructions given for the operation of each device. For example, a personal computer or telephone outside a house that has each device in operation can be used to give operation instructions over the Internet, phone line or the like. Also, instructions for device operations can be given over a wireless network, using a handset such as a portable phone, personal handy-phone system (PHS) handset or personal digital assistants (PDA). Such operating terminals have essentially the same configuration as the remote control unit 3 described above, with the communication device 41 being an interface corresponding to the respective communication means. In such cases, in the same manner as described above, terminal IDs such as for personal computers, telephones, portable telephones, PHS handsets, PDAs are registered beforehand on the home server 1, and at the same time, public keys for authentication of each operating terminal are also registered on the home server 1. In the case of telephones, portable telephones, PHS handsets and the like, the corresponding telephone number can be registered as a terminal ID. An explanation will now be given of a case where this type of operating terminal is used to access from outside the house and operate each device. Here the explanation will be given using as an example the adjustment of temperature settings on the air conditioner 55.

First, an operating terminal accesses the home server 1 over the home network 5, sends its terminal ID and sends a request signal requesting information regarding the current state of the air conditioner 55. The home server 1 performs authentication of the operating terminal as shown in FIG. 6; if authentication is successful, information relating to the current state of the air conditioner 55 is retrieved and sent to the operating terminal.

A user refers to the information regarding the current state of the air conditioner 55 displayed on the display device 40 of the operating terminal, and inputs any necessary instructions for turning on the power of the air conditioner 55, changing the operational mode, changing the temperature settings and the like. The operating terminal sends the instruction information inputted by the user, as well as the terminal ID of the operating terminal, to the home server 1.

When the home server 1 receives this instruction information, the home server 1 again performs authentication of the operating terminal using terminal information based on the terminal ID. If authentication is successful here, control signals for operating the air conditioner 55 are generated based on the instruction information, and control of the air conditioner 55 is executed.

By thus performing authentication each time instruction information is received from the operating terminal, unauthorized access by third parties can be prevented, and each device located at home can be safely operated. Moreover, because authentication is performed at the home server 1 while a user is not conscious of the terminal ID of the operating terminal, a user does not have to memorize passwords, and a leakage of a password to a third party, and the unauthorized use thereof, can be prevented.

Data transmitted in communications between an operating terminal and the home server 1 can be encrypted. In such cases, even if communications over a telephone line, the Internet, or wireless telephone network are being monitored by a third party, the contents of those communications can remain undivulged. Public key encryption can be used as an encryption method.

Access Restriction Based on Individual Information

The home server 1 can be configured to administrate individual information for a user operating an operating terminal, and to restrict access based on this individual information. For example, individual information is registered so that each remote control unit 3 is corresponded to an individual, and operation from the remote control unit 3 can be restricted based on this individual information.

Figure 8:
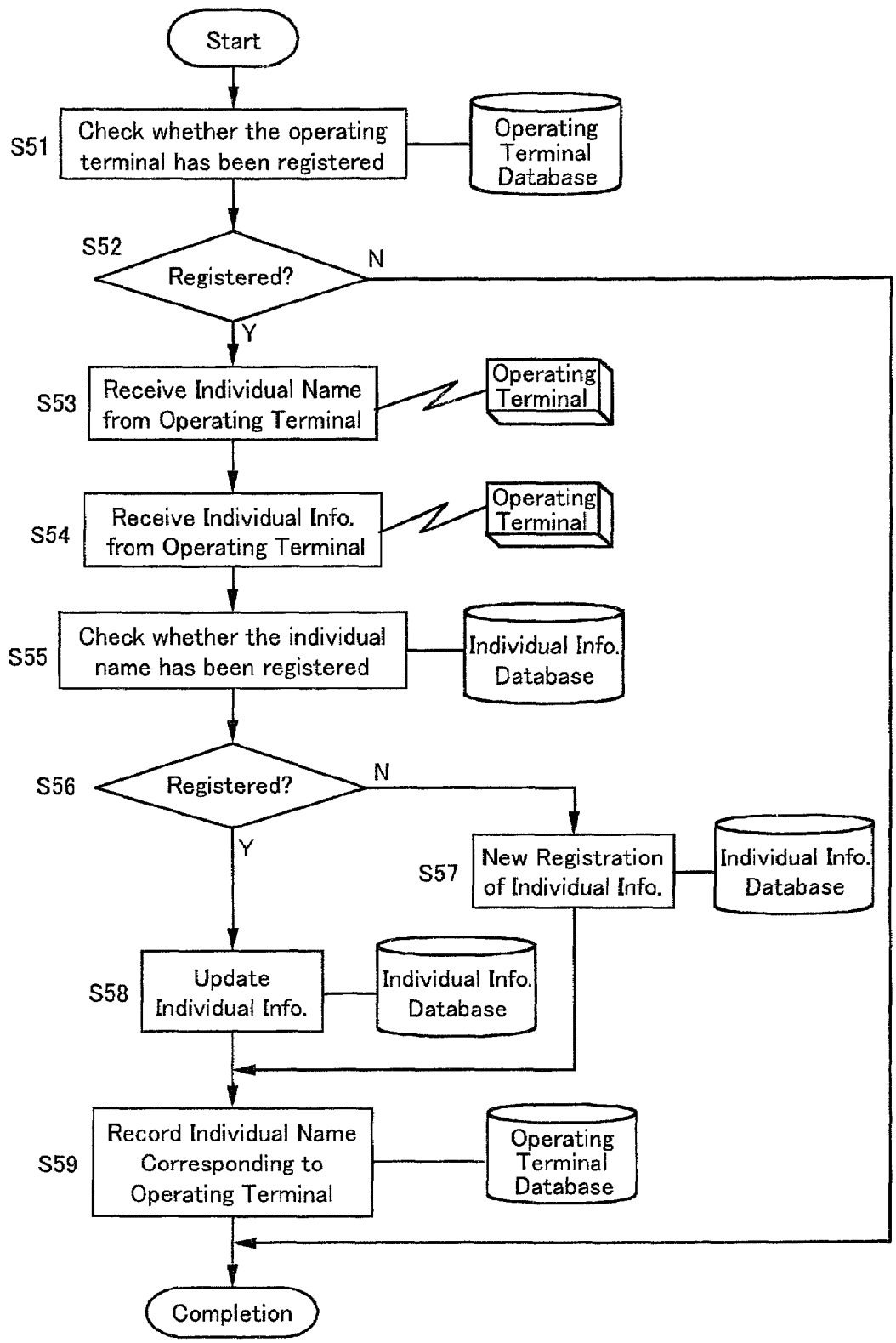
FIG. 8 is a flowchart showing individual information registration processing.

An explanation will be made with reference to FIG. 8, which is a flowchart showing procedures when individual information of a user operating the remote control unit 3 is registered on the home server 1.

When there has been a request for registration of individual information from the remote control unit 3, in step S51, terminal information of the operating terminal requesting registration is called up. Specifically, the terminal information of the corresponding terminal ID is retrieved from the terminal information database 19.

In step S52, it is determined whether terminal information of the operating terminal requesting registration has been registered or not. If it is determined that terminal information of the operating terminal requesting registration has been registered in the terminal information database 19, control proceeds to step S53; if not, an error message is sent and the processing is terminated.

In step S53, an individual name is received from the operating terminal. The home server 1 sends an input request prompting a user to input an individual name into the remote control unit 3, and then receives from the remote control unit 3 the individual name information that the user inputs in response to this request.

In step S54, individual information is received from the operating terminal. The home server 1 sends an input request prompting a user to input individual information into the remote control unit 3, and then receives from the remote control unit 3 the individual information that the user inputs in response to this request. Specifically, the individual information to be inputted by a user can be, for example, such basic data as name or sex, or, in the case of a service using a membership system, the password for that service can be registered as such. Further, address, telephone number, credit card number or the like needed when doing shopping on credit or on-line shopping can be registered beforehand. For authentication of a user using the remote control unit 3, fingerprint information, iris information, retinal information, voiceprint information or other biological information can be registered beforehand.

In step S55, information is read from the individual information database 20 in order to determine whether or not the received individual name has been registered. In step S56, it is determined whether or not the received individual name has been registered. If it is determined that the received individual name is registered in the individual information database 20, control proceeds to step S58; if not, control proceeds to step S57.

In step S57, the received individual information is newly registered. Specifically, a record of the received individual information is created and stored in the individual information database 20. In step S58, based on the received individual information, the contents of the corresponding record in the individual information database 20 are updated.

In step S59, an individual name corresponding to the operating terminal is recorded. In order to associate the remote control unit 3 requesting registration and the registered individual information, the individual name is associated with the corresponding terminal information of the terminal information database 19 and thus registered.

By associating and registering in this manner individual information of a user operating an operating terminal, access restrictions can be performed using individual information. In cases where access restrictions have been imposed on individuals with regard to access to information stored in the stored information database 23 of the home server 1 and to the use of cable television or satellite broadcasting, when there is an access request from an operating terminal, after operating terminal authentication is conducted, individual information associated with that operating terminal is read, a determination is made as to the access right of the user operating the operating terminal, and a decision is made whether or not to allow access.

For example, when an operating terminal has requested access to information within the stored information database 23, the home server 1 performs authentication of the operating terminal requesting registration, and, if authentication of the operating terminal is successful, extracts individual information associated with that operating terminal from the individual information database 20, and determines that individual's access right to the requested information before deciding whether to grant access. In this manner, in cases where video data and image data and the like deemed inappropriate for minors is stored in the stored information database 23, when there is a request for access to that information from an operating terminal, the home server 1 specifies the individual name in the terminal information database 19 corresponding to that operating terminal, and using this individual name acquires individual information within the individual information database 20, thereupon determining right of access to that information. If a setting for the requested information indicates that access can be granted only to persons 18 years and older, and if the individual information of a user corresponding to the operating terminal requesting registration indicates an age under 18, the request for access to the information is denied. Requests for access to information stored in the stored information database 23 are likely to be requests for the information to be displayed on the television 51; when access is denied, a message indicating that the user does not have access right can be outputted either onto the screen of the television 51 or outputted through speakers, thus informing the user.

For registration and change of individual information, a master password can be set for each operating terminal, and such registration or change can be executed only when the proper master password has been inputted. So doing will help prevent third parties from manipulating individual information for the purpose of unauthorized use.

Data Transmission to Outside the House

When shopping outside the home, payment can be made by storing beforehand a credit card number in the individual information database 20 and then using a registered operating terminal to communicate with a credit card company via the home server 1. In such a case, the home server 1 communicates with the credit card company over the external network 7 and sends it the credit card number and other necessary information, meaning that the credit card number is not revealed to a store where shopping was done and payment can be made with greater security.

For bi-directional communication such as with cable television and satellite broadcasting, and online shopping over the Internet from the personal computer 53, by registering such information as address, telephone number, and credit card number as individual information, this registered information enables a user to easily transmit data and save a lot of time. Because this type of individual information cannot be seen using an unregistered operating terminal, there is no danger of the information being leaked to a third party.

When accessing from outside the home pay content employing a membership system, the system can be configured so that a password for access to that pay content is stored beforehand in the individual information database 20, and the home server 1 communicates with the provider of those pay contents to allow use thereof. In such a case, a user does not have to remember all the passwords for each pay content provider and the passwords set for each service, and there is no danger of the password being leaked to a third party.

Access Restriction Using Terminal Information and Individual Information

Figure 9:
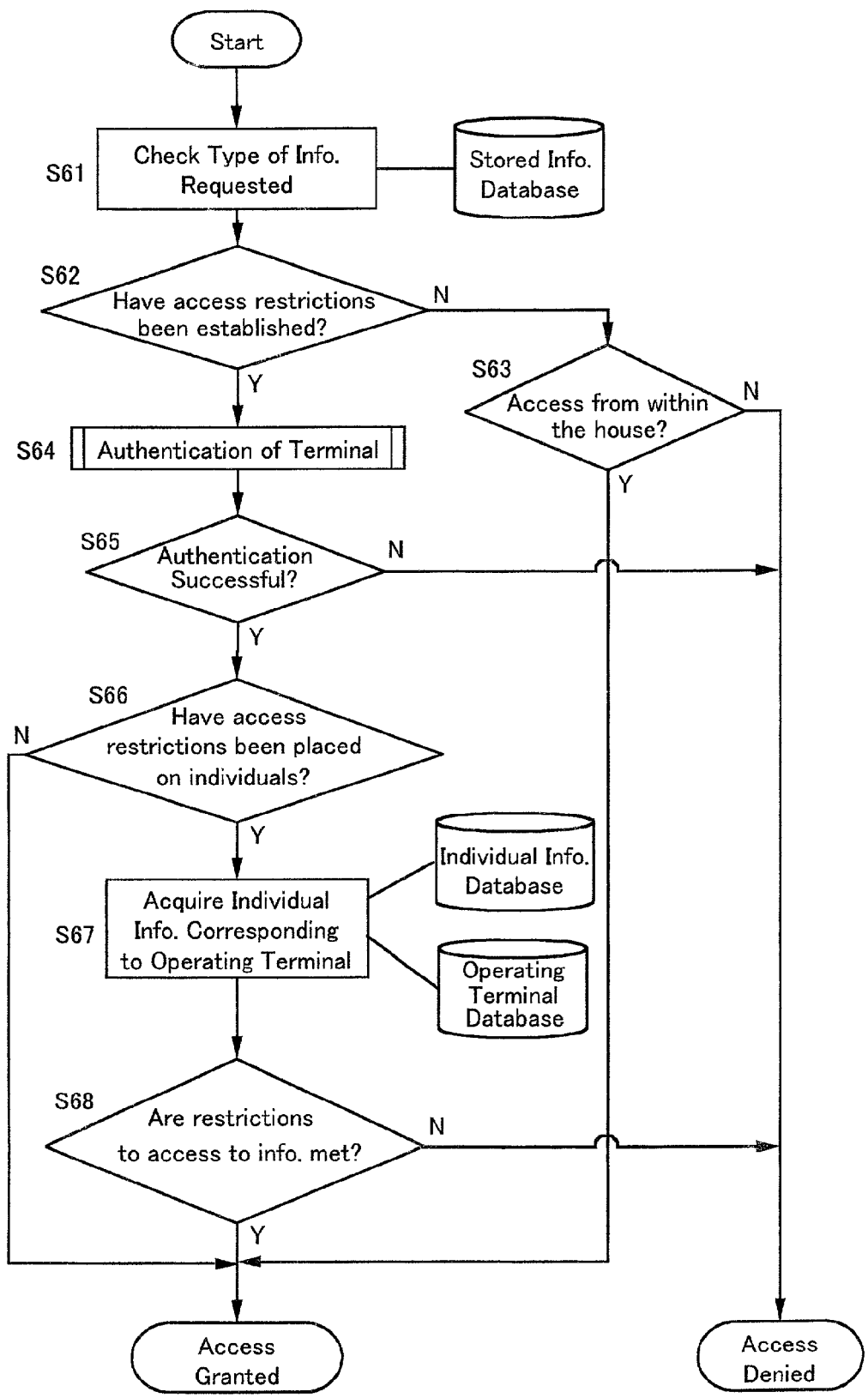
FIG. 9 is a flowchart showing processing for access restriction using terminal information and individual information.

Access restriction using terminal information and access restriction using individual information of a user associated with an operating terminal will be explained together, as restriction of access to the home server 1, with reference to the flowchart of FIG. 9. Here, too, the explanation will be made using a case where there has been a request for access to information stored in the stored information database 23.

When there has been a request for access to information stored in the stored information database 23, in step S61, data regarding the type of information requested is acquired from the stored information database 23. In step S62, determination is made as to whether any access restrictions have been imposed on the requested information. Regarding the information stored in the stored information database 23 in some cases access restrictions may be imposed for each piece of information; in other cases access restrictions may be imposed for classified types of information. In either case, if no access restrictions have been imposed on the information to which access was requested, then control proceeds to step S63; if there are access restrictions, control proceeds to step S64.

In step S63, it is determined whether access is from within the house or not. Terminal information is acquired using the terminal ID of the operating terminal from which the access request was sent, and it is determined whether this is an operating terminal within the house; if the access is not from the house, then access from this operating terminal is denied, and the corresponding information stored in the stored information database 23 is not provided. Also, if it is determined that the access is from the house, then access from this operating terminal is granted, and the corresponding information stored in the stored information database 23 is provided. In this case settings have been made so that access from outside the house is denied to information for which there are no access restriction settings; alternatively, access from outside the house can be permitted.

In step S64, operating terminal authentication is performed. As described above, by sending data for authentication, receiving from the operating terminal the data string encrypted at the operating terminal with a secret key, using a public key to decrypt this, and then comparing the decrypted data with the original data string for authentication, it is determined whether an operating terminal is a properly registered one. If operating terminal authentication fails in step S65, then a message indicating that access is denied is sent to the operating terminal and the processing is terminated. If operating terminal authentication is successful in step S65, control proceeds to step S66.

In step S66, it is determined whether there are settings for access restriction based on individual information. If there are no individual information-based access restrictions on the requested information, the access request from the operating terminal is allowed. If there are individual information-based access restrictions on the requested information, control proceeds to step S67.

In step S67, based on the terminal ID of the operating terminal that sent the access request, the corresponding terminal information is acquired from the terminal information database 19, the individual name of the user associated therewith is specified from this, and individual information of the corresponding user is acquired from the individual information database 20.

In step S68, it is determined whether the acquired individual information meets access restrictions to the information. If the individual information of the user associated with the operating terminal that sent the access request does not meet the access restrictions to the requested information, a message indicating that access has been denied is sent to the operating terminal, and processing is terminated. If the individual information of the user associated with the operating terminal that sent the access request does meet the access restrictions to the requested information, then the information is presented to the operating terminal.

In this manner, by restricting access based on such information as whether or not the operating terminal that made the request is in the house, terminal information of the operating terminal, or individual information of the user associated with the operating terminal, the effort made by the user during authentication is reduced and, without sacrifice of convenience, unauthorized access by a third party is prevented and household information is protected.

Even if an operating terminal is lost, by deleting the information of that operating terminal from the terminal information database 19 of the home server 1, a third party can be prevented from using that operating terminal to conduct unauthorized access, without the need to delete individual information records.

OTHER EMBODIMENTS

If a portable telephone or a PHS handset is used as an operating terminal, the same operating terminal can be used for sending instruction information both inside and outside a home. In this case, the location information service offered by the company providing the portable telephone or PHS service is used to acquire the location of the operating terminal, and based on this the determination is made of whether an operating terminal is inside or outside a house.

Through the use of the present invention, because access right to a device control server is set for each operating terminal one by one, associated with an identifier for each operating terminal and registered, instruction information for the operation of a device can be received whether access comes from inside or from outside a house; not only is unauthorized access by third parties prevented, the setting of passwords for each operating terminal and for each information to be used can be eliminated, as well as the effort involved in memorizing them.

While only selected embodiments have been chosen to illustrate the present invention, to those skilled in the art it will be apparent from this disclosure that various changes and modifications can be made herein without departing from the scope of the invention as defined in the appended claims. Furthermore, the foregoing description of the embodiments according to the present invention is provided for illustration only, and not for the purpose of limiting the invention as defined by the appended claims and their equivalents.

What is claimed is:

1. A device control server interconnected over a home network with a plurality of different types of devices in a home, said server controlling one or more of said plurality of different types of devices based on instruction information, relating to the operation of one or more of said plurality of different types of devices, sent from a single operating terminal directly to each of said plurality of devices, said server comprising:

terminal information acceptance means for accepting registration of the single operating terminal for the purpose of associating a unique identifier set for said single operating terminal with an operating terminal access right for accessing said one or more devices of said plurality of different types of devices connected on the home network;

terminal information storage means for storing said terminal information;

instruction information acceptance means for accepting instruction information that includes an identifier for said operating terminal and instruction signals relating to said operating terminal;

access right determination means for determining the access right of said operating terminal based on said instruction information; and device control means controlling said one or more devices based on the access right of said single operating terminal as determined by said access right determination means and on instruction signals transmitted directly from said single operating terminal to said one or more devices included in said instruction information.

2. A device control server according to claim 1, further comprising:

public key acceptance means for, when accepting registration of said terminal information for accessing said one or more devices connected to the home network; accepting a public key set for said operating terminal and storing said public key along with said terminal information in said terminal information storage means; and operating terminal authentication means for performing authentication on said operating terminal by sending predetermined data, receiving said predetermined data after encryption thereof at said operating terminal using a secret key, decrypting using said public key, and comparing with said predetermined data.

3. A device control server according to claim 1, further comprising:
   electronic information acquisition means for acquiring electronic information and
   electronic information storage means for storing electronic information acquired by said electronic information acquisition means, wherein:
   when said instruction signals relating to operation of said one or more devices include access to electronic information stored in said electronic information storage means, said access right determination means determines the access right of said operating terminal before determining whether or not to allow presentation of said electronic information.

4. A device control server according to claim 1, further comprising external communication means capable of connecting with an external network existing outside the house, wherein:
   when said instruction signals relating to operation of said one or more devices include access to said external network, said access right determination means determines the access right of said operating terminal before determining whether to grant access to said external network.

5. A device control server according to claim 4, wherein determination of whether to grant access is made for each content on said external network.

6. A device control server according to claim 1, further comprising terminal location determination means for determining whether said operating terminal is inside or outside the house based on instruction information accepted by said instruction acceptance means, wherein said access right determination means determines access right for said operating terminal based on determination results of said terminal location determination means.

7. A device control server according to claim 1, further comprising individual information acceptance means accepting registration of individual information for associating information relating to a user operating said operating terminal with said operating terminal, wherein said access right determination means extracts individual information associated with this operating terminal based on said operating terminal identifier included in said instruction information, and determines access right based on said individual information and said terminal information.

* * * * *